US010646899B2

(12) United States Patent
Imai et al.

(10) Patent No.: US 10,646,899 B2
(45) Date of Patent: May 12, 2020

(54) CELL SORTER

(71) Applicant: KABUSHIKI KAISHA TOSHIBA, Minato-ku (JP)

(72) Inventors: Kaita Imai, Tokyo (JP); Shouhei Kousai, Yokohama (JP); Yosuke Akimoto, Yokohama (JP); Michihiko Nishigaki, Kawasaki (JP); Yutaka Onozuka, Yokohama (JP); Miyu Nagai, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 6 days.

(21) Appl. No.: 15/915,633

(22) Filed: Mar. 8, 2018

(65) Prior Publication Data
US 2019/0084011 A1 Mar. 21, 2019

(30) Foreign Application Priority Data
Sep. 15, 2017 (JP) ................. 2017-178140

(51) Int. Cl.
B07C 5/342 (2006.01)
B03C 5/00 (2006.01)
(Continued)

(52) U.S. Cl.
CPC ...... *B07C 5/3427* (2013.01); *B01L 3/502761* (2013.01); *B03C 1/288* (2013.01); *B03C 5/005* (2013.01); *B03C 5/026* (2013.01); *B07C 5/3422* (2013.01); *G01N 15/147* (2013.01); *G01N 15/1484* (2013.01); *B01L 2200/0652* (2013.01); *B01L 2300/0645* (2013.01); *B01L 2300/0816* (2013.01); *B01L 2300/0864* (2013.01);
(Continued)

(58) Field of Classification Search
CPC ....... B07C 5/3427; B03C 1/288; B03C 5/005; B03C 5/3422; B03C 2201/18; B03C 2201/24; B03C 2201/26; G01N 15/147; G01N 15/1484
USPC ........................................ 209/128
See application file for complete search history.

(56) References Cited

U.S. PATENT DOCUMENTS 6,592,821 B1 * 7/2003 Wada .................. B01F 13/0062
422/50
9,000,357 B2 * 4/2015 Mueth .................... G02B 21/32
250/251
(Continued)

FOREIGN PATENT DOCUMENTS

JP 2004-113223 4/2004
JP 2009-100698 5/2009
(Continued)

Primary Examiner — Terrell H Matthews
(74) Attorney, Agent, or Firm — Oblon, McClelland, Maier & Neustadt, L.L.P.

(57) ABSTRACT

According to one embodiment, a cell sorter includes a flow channel which supplies a sample liquid containing particles, a plurality of branch channels connected to the flow channel, an image sensor which has a pixel region covering the flow channel and the branch channels, a determination unit which determines the characteristics of the particles in the sample liquid from a measurement signal of the pixel region, and a separation unit guides the particles in the sample liquid to any of the branch channels based on the determination result of the determination unit.

19 Claims, 6 Drawing Sheets

(51) Int. Cl.
　　　*B03C 5/02*　　　(2006.01)
　　　*B01L 3/00*　　　(2006.01)
　　　*B03C 1/28*　　　(2006.01)
　　　*G01N 15/14*　　(2006.01)
　　　*G02B 5/20*　　　(2006.01)
　　　*G01N 15/10*　　(2006.01)

(52) U.S. Cl.
　　　CPC . *B01L 2400/043* (2013.01); *B01L 2400/0421* (2013.01); *B01L 2400/0424* (2013.01); *B01L 2400/0439* (2013.01); *B01L 2400/0454* (2013.01); *B01L 2400/0487* (2013.01); *B03C 2201/18* (2013.01); *B03C 2201/24* (2013.01); *B03C 2201/26* (2013.01); *G01N 2015/1006* (2013.01); *G01N 2015/149* (2013.01); *G02B 5/20* (2013.01)

(56) References Cited

U.S. PATENT DOCUMENTS

| | | | | |
|---|---|---|---|---|
| 2003/0153085 | A1* | 8/2003 | Leary | G01N 15/14 436/63 |
| 2009/0107262 | A1 | 4/2009 | Hashimoto et al. | |
| 2011/0269221 | A1 | 11/2011 | Katsumoto et al. | |
| 2013/0083315 | A1* | 4/2013 | Lo | G01J 3/46 356/73 |
| 2013/0252237 | A1* | 9/2013 | Wagner | G01N 15/14 435/6.1 |
| 2014/0248656 | A1* | 9/2014 | Demirci | G01N 15/1484 435/30 |
| 2014/0262970 | A1* | 9/2014 | Sato | B03C 5/005 209/127.1 |
| 2014/0376816 | A1 | 12/2014 | Lagae et al. | |
| 2015/0132766 | A1 | 5/2015 | Yasuda et al. | |
| 2016/0231274 | A1* | 8/2016 | Tirapu Azpiroz | G01N 27/44791 |

FOREIGN PATENT DOCUMENTS

| | | |
|---|---|---|
| JP | 2010-181399 | 8/2010 |
| JP | 5712396 | 5/2015 |
| JP | 5991236 | 9/2016 |
| JP | 2017-75958 | 4/2017 |

\* cited by examiner

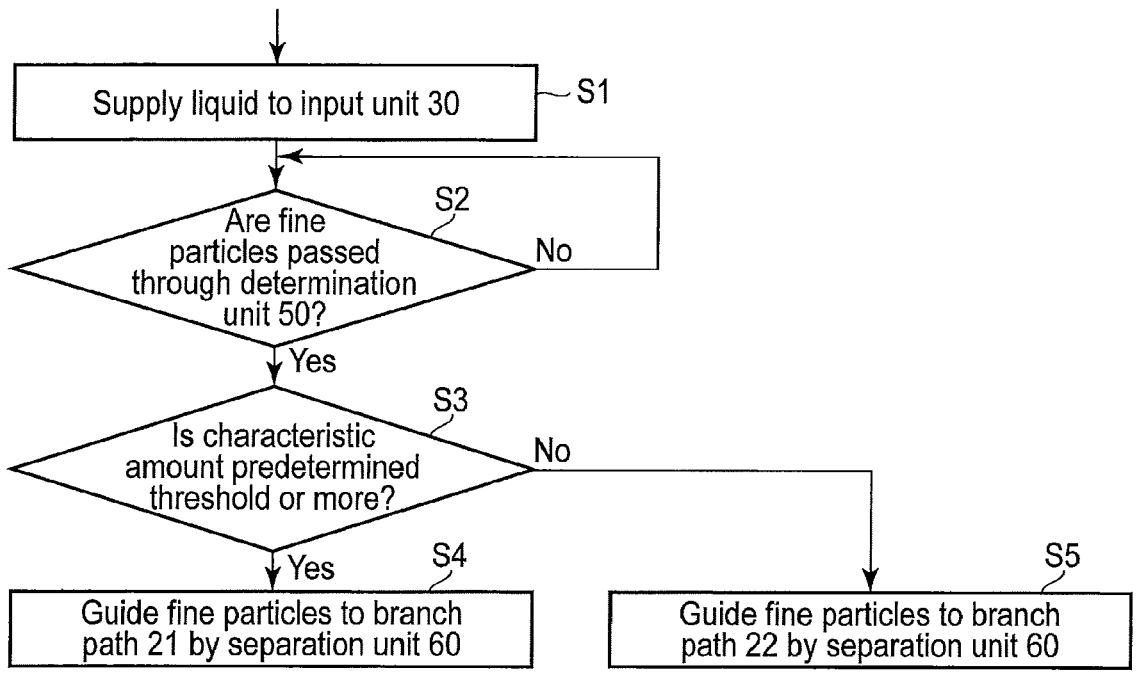
F I G. 4
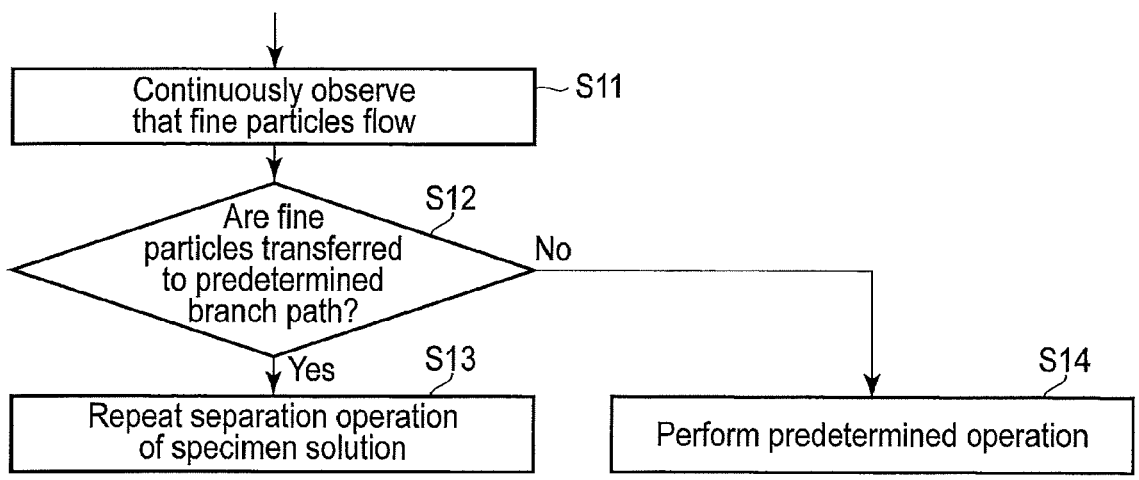
F I G. 5

| Dye | Characteristics | Combination to be needed |
|---|---|---|
| 7-AAD | Dead cells are stained with fluorescent dye | OFF |
| PE | Immunostaining (Pos control) | ON |
| BV510 | Immunostaining (Neg control) | OFF |

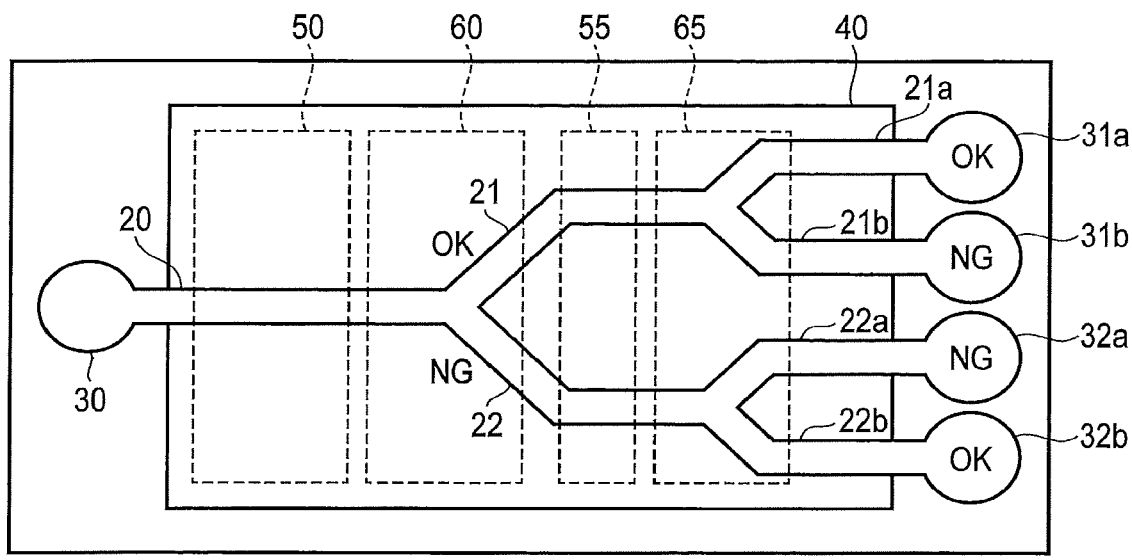
F I G. 7
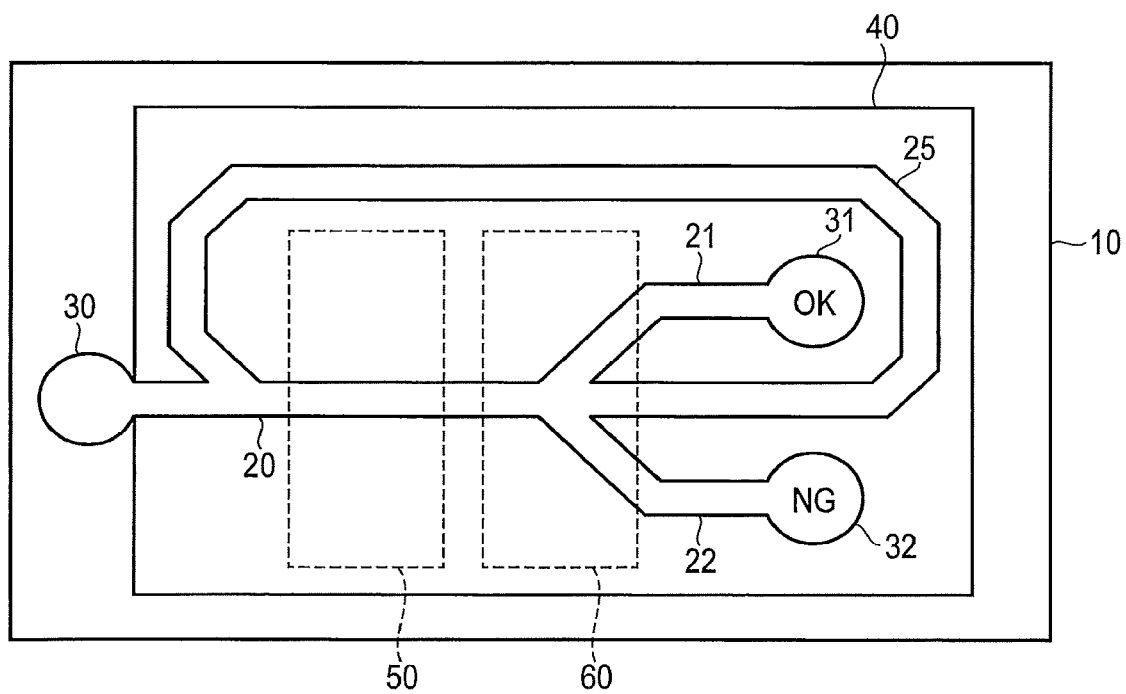
F I G. 8

CELL SORTER

CROSS-REFERENCE TO RELATED APPLICATIONS

This application is based upon and claims the benefit of priority from Japanese Patent Application No. 2017-178140, filed Sep. 15, 2017, the entire contents of which are incorporated herein by reference.

FIELD

Embodiments described herein relate generally to a cell sorter which separates specific cells (particle) from a sample liquid.

BACKGROUND

In the cell biology field, there has been recently used a cell sorter which separates only specific cells from a cell population in a sample liquid. This cell sorter can distinguish cells by irradiating a sample liquid dropwise injected (liquid floating cells or suspension of cells) with laser light and measuring scattered light, fluorescent light or the like. Further, specific cells can be separated into predetermined tubes by applying electric field or magnetic field.

However, this type of device has problems such as damage on the cells in the separation process, low accuracy of separation or low throughput of separation. Further, there is another problem that it is not observable whether the separation of each of the cells is appropriately performed.

BRIEF DESCRIPTION OF THE DRAWINGS

FIG. 4 is a flow chart for explaining operation of the determination unit and the separation unit;

FIG. 5 is a flow chart for explaining operation of the observation unit;

FIG. 7 is a plan view illustrating a schematic configuration of a cell sorter according to a third embodiment;

FIG. 8 is a plan view illustrating a schematic configuration of a cell sorter according to a fourth embodiment;

DETAILED DESCRIPTION

In general, according to one embodiment, a cell sorter comprises a flow channel which supplies a sample liquid containing particles from one end side; a plurality of branch channels which are connected to the other end side of the flow channel; an image sensor which has a pixel region covering the flow channel and the branch channels; a determination unit which determines the characteristics of the particles in the sample liquid from a measurement signal of the pixel region of the portion of the flow channel of the image sensor; a separation unit which is provided adjacently to the connection of the flow channel and the branch channels and guides the particles in the sample liquid to any of the branch channels based on the determination result of the determination unit; and an observation unit which observes the transfer of the particles from the flow channel to the branch channel from the measurement signal of the image sensor.

In order to solve the problem of the cell sorter explained above, a cell sorter using a micro fluid device is proposed. In the procedure using thereof, cells flow into a liquid in a micro fluid device and are separated by dielectrophoresis (DEP) or the like, thereby reducing damage on the cells. However, similarly to the related art, there is still the remaining problem that it is not observable whether the separation of each of the cells is appropriately performed.

Hereinafter, the cell sorter, by which the problem above is overcome, will be explained with reference to the drawings.

First Embodiment

Figure 1:
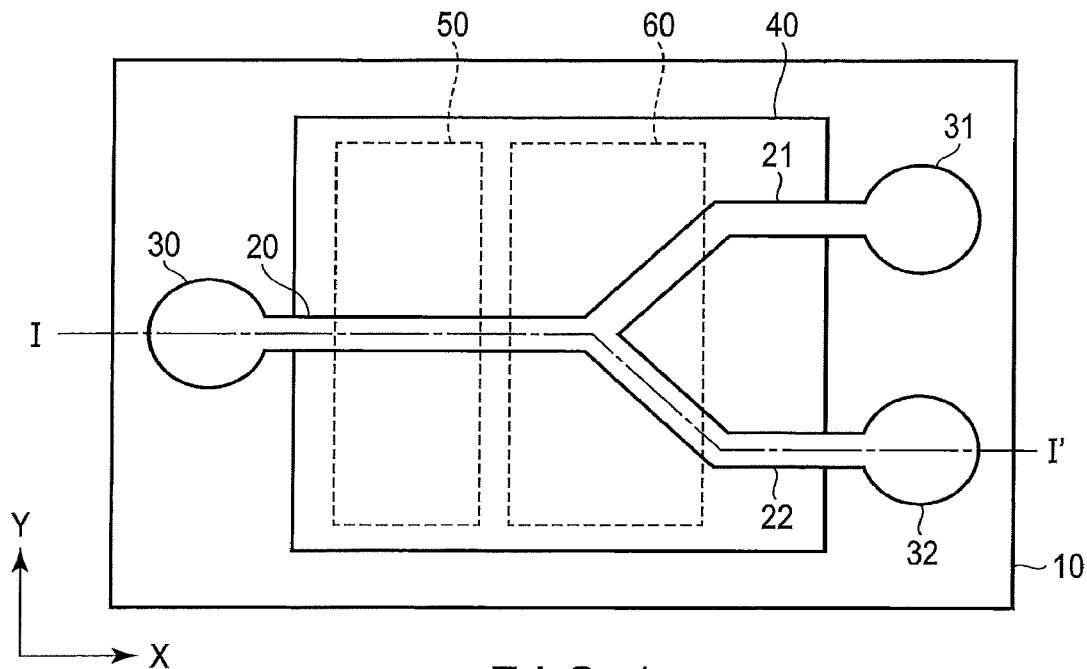
FIG. 1 is a plan view illustrating a schematic configuration of a cell sorter according to a first embodiment.
Figure 2:
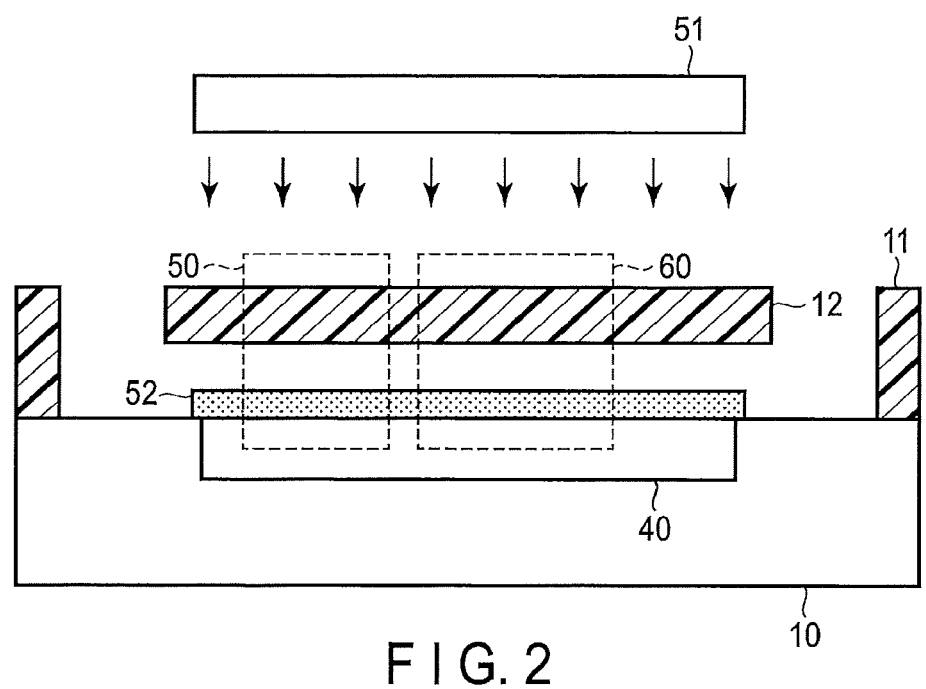
FIG. 2 is a cross sectional view I-I' of FIG. 1.

FIGS. 1 and 2 are views for explaining the schematic configuration of the cell sorter according to the first embodiment, wherein FIG. 1 is a plain view and FIG. 2 is a cross-sectional view I-I' of FIG. 1.

On a substrate 10 such as a semiconductor substrate using Si or glass epoxy as the base material, a flow channel structure 11 made of a resin such as poly dimethyl siloxane (PDMS) is layered. The flow channel structure 11 is selectively etched, thereby forming a flow channel (first flow channel) 20, branch channels (second channels) 21 and 22, an input unit 30, and output units 31 and 32. The top surface of each of the flow channels 20, 21, and 22 is covered with a lid 12 made of the same candidates of the material as that of the flow channel structure 11. Note that the lid 12 may be formed by embedding a sacrificial layer into each of the flow channels 20, 21, and 22, depositing a thin film, and removing the sacrificial layer.

The flow channel structure 11 and the lid 12 may be materials which transmit the illumination light and causes less scattering and autofluorescent light. The material for the flow channel structure 11 or the lid 12 is not necessarily PDMS, and other moldable plastic materials or glass may be used. The input unit 30 is formed at one end side of the substrate 10 (for example, left side) and can supply the sample liquid. For example, the output units 31 and 32 are separately formed at the other end side of the substrate 10 (for example, right side) in a direction Y. The output units 31 and 32 can store the sample liquid.

The flow channel 20, whose one end side is connected to the input unit 30, is linearly formed along a direction X. A part of each of the branch channels 21 and 22 is bendably formed so that the other end side of the flow channel 20 is connected to the output units 31 and 32. That is, one end of the branch channel 21 is connected to the other end of the flow channel 20, and the other end of the branch channel 21 is connected to the output unit 31. One end of the branch channel 22 is connected to the other end of the flow channel 20, and the other end of the branch channel 22 is connected to the output unit 32. Further, a pressure adjustment pump is connected to at least one of the input unit 30 and the output units 31 and 32, whereby the sample liquid flows from the input unit 30 to the output units 31 and 32.

On the substrate 10, an image sensor 40 such as CMOS or CCD is formed so as to cover the whole region of the flow channel 20 and the branch channels 21 and 22. A determination unit 50 is formed adjacently to a part of the flow channel 20, and a separation unit 60 is formed adjacently to a connected part among the flow channel 20 and the branch channels 21 and 22. Here, the determination unit 50 and the separation unit 60 are located at an imaging region (pixel region) of the image sensor 40.

Note that the image sensor 40 has a pixel region having the same area as that of the sensor 40, and it may have any pixel region which can cover the whole of the determination unit 50 and the separation unit 60. In the examples of FIGS. 1 and 2, the region of the image sensor 40 is defined as a pixel region, and the image sensor may be fabricated in the region of the periphery (for example, the region corresponding to the substrate 10). More specifically, the image sensor 40 may represent a case (1) where the image sensor 40 is, in particular, a light receiver of an image sensor formed on a semiconductor substrate (such as Si) or may further represent a case (2) where an image sensor representing the case (1) is mounted on a circuit board (such as glass epoxy).

The determination unit 50 is configured to include a light source 51 which irradiates the sample liquid in the flow channel 20 with light, a sensor which measures the light from the sample liquid (image sensor 40), and an optical filter 52. Then, the determination unit 50 is configured to determine the characteristics of the cells in the sample liquid in the flow channel 20 based on the scattered light or fluorescent light from the sample liquid. Note that, as the optical filter 52, a dielectric multilayer filter (interference filter) and/or a dye or a color filter made of a dye (absorption filter) may be used.

Figure 3:
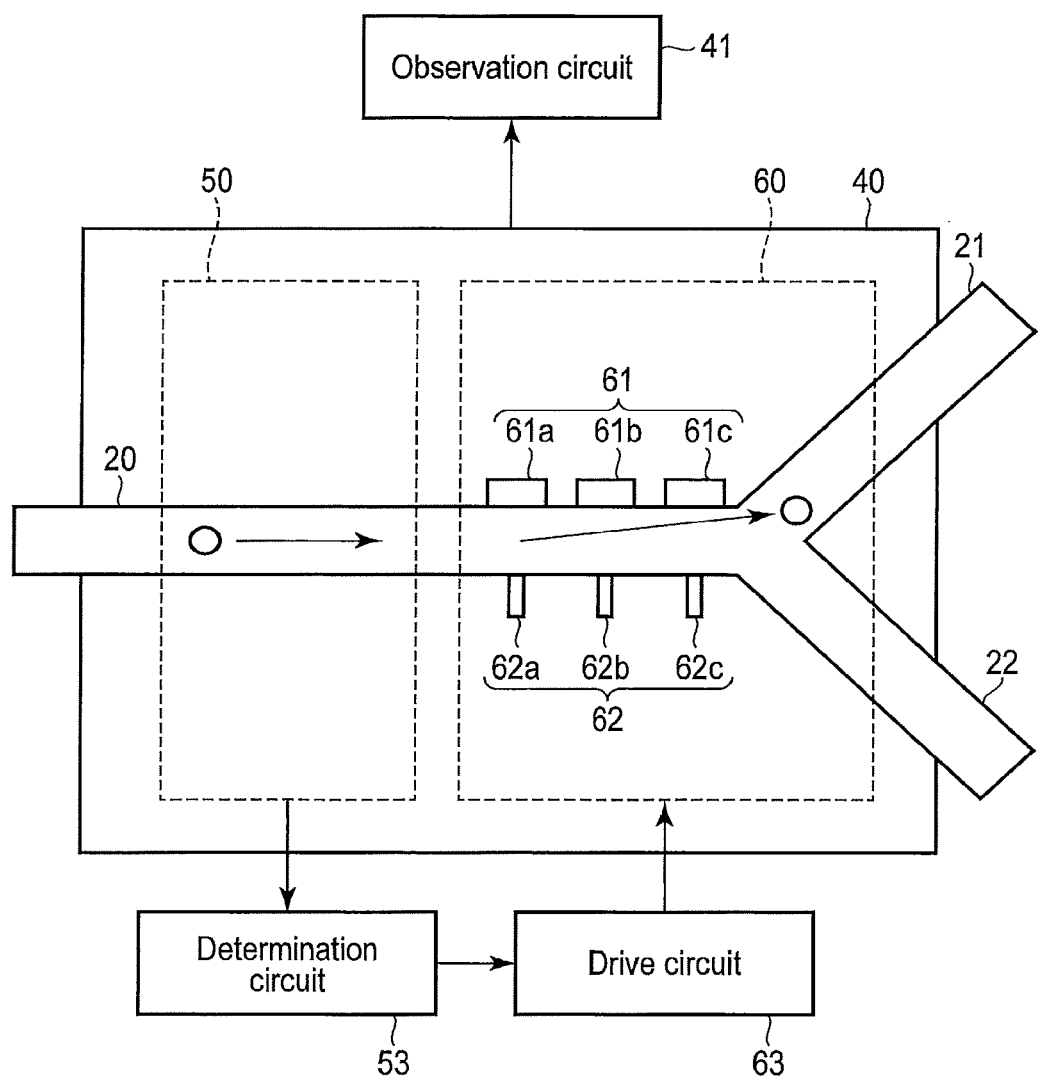
FIG. 3 is a pattern diagram illustrating a relationship among a determination unit, a separation unit, and an observation unit in the cell sorter of FIG. 1.

The separation unit 60 is configured to guide the particles in the sample liquid in the flow channel 20 to either the branch channel 21 or 22 using dielectrophoresis, electrophoresis, ultrasonic wave, air pressure control, optical tweezer, magnetism or the like. For example, in the case of dielectrophoresis, as illustrated in FIG. 3, the electrodes 61 (61a, 61b, 61c) and 62 (62a, 62b, 62c) may be arranged in the direction Y so as to face the vicinity of a downstream end of the flow channel 20. The electrodes 61 and 62 may have different sizes, and a plurality of the electrodes 61 and 62 may be formed separately in the direction Y. The force of the electric field from the electrodes 61 and 62 can be applied to the particles in the direction Y. That is, a predetermined field intensity gradient is formed by the electrodes 61 and 62, thereby giving a dielectric force to the particles. Then, the particles such as cells in the sample liquid are configured to be guided to either the branch channel 21 or 22 by controlling the applied voltage of the electrodes 61 and 62 of the separation unit 60 based on the determination result of the determination unit 50.

Note that the electrodes 61 and 62 may be comb-shaped electrodes. In this case, 61a, 61b, and 61c are electrode fingers of a comb-shaped electrode 61, and 62a, 62b, and 62c are electrode fingers of a comb-shaped electrode 62.

More specifically, as illustrated in FIG. 3, the determination unit 50 has a determination circuit 53 which determines the characteristics of the particles based on the measurement signal from the pixel region of the image sensor 40 corresponding to the upstream of the flow channel 20. The separation unit 60 has a drive circuit 63 which applies an AC voltage having a predetermined frequency to the electrodes 61 and 62. Then, the particles in the sample liquid are configured to be guided to either the branch channel 21 or 22 by controlling the frequency and/or voltage to be applied to the electrodes 61 and 62 by the drive circuit 63 based on the determination result of the determination circuit 53.

The determination circuit 53 may be consolidated and mounted on the same substrate 10 as that of the image sensor. Further, the determination circuit 53 may be mounted using various kinds of ICs, such as a micro controller, an FPGA, a GPU, and a CPU as a device for processing the measurement signal read from the image sensor. Further, an IC on which the processor is mounted may be bonded to the substrate 10 and layered.

Further, there is formed an observation circuit 41 which observes the movement of the particles in the flow channels 20, 21, and 22 based on the measurement signal from the pixel region of the whole of the image sensor 40.

In the configuration, when a sample liquid containing particles, such as cells is supplied to the input unit 30 in a state of filling a liquid (for example, phosphate buffered saline) in the flow channels 20, 21, and 22, the sample liquid flows from the upstream side to the downstream side of the flow channel 20. At this time, the light is emitted from the light source 51 and the light transmitted through the flow channel 20 is received by the image sensor 40, whereby the determination circuit 53 determines the characteristics of the particles passing through the flow channel 20.

That is, as illustrated in the flow chart of FIG. 4, the sample liquid is supplied to the input unit 30 (Step S1) and then it is analyzed whether the particles have passed through the determination unit 50 after supplying (Step S2). When it is analyzed that the particles have passed in S2, it is determined whether the characteristic amount of the particles is a threshold or more (Step S3).

When the light source 51 emits light having a range or ranges of wavelength which passes through the optical filter 52, the presence of the particles in the sample liquid results in refraction of light. Thus, the refracted light is measured by the image sensor 40 so that the shape of the particles can be determined. Specifically, the size, the level of breakage of the spherical shape, and the internal structure can be measured by analyzing the shape of the particles. Thus, only the particles to be separated can be determined.

When excitation light for generating fluorescent light is emitted from the light source 51, the presence of the particles in the sample liquid causes generation of fluorescent light corresponding to the particles. Thus, the fluorescent light with a predetermined range or predetermined ranges of wavelength is measured by the image sensor 40 so that the fluorescent characteristic amount of the particles can be determined. Here, the range or ranges of wavelength of the fluorescent light is selected by the optical filter 52 so that only the fluorescent characteristic amount to be separated can be determined.

More specifically, the fluorescent characteristic amount is a biochemical characteristic of objects represented by immunostaining using a fluorescent dye preliminarily carried out for the target cells, a fluorescent protein expressed under predetermined conditions by gene transfer technology, and the like.

From the light source 51 of the determination unit 50, excitation light with a range or ranges of wavelength that efficiently generates fluorescent light is emitted. Then, the fluorescent light passed through the optical filter 52 is measured by the image sensor 40 so that the presence or absence or intensity of the fluorescent light of target cells can be determined.

When the characteristic amount of the particles is determined to exceed the threshold in Step S3 above, i.e., when the particles in the flow channel 20 are the particles to be separated, the particles are guided to the branch channel 21 at the upper side of FIG. 1 by dielectrophoresis in the separation unit 60 (Step S4). As a result, the particles are stored in the output unit 31. When the characteristic amount of the particles is determined not to be the threshold or more in Step S3, i.e., when the particles are not the particles to be separated, the particles are guided to the second branch channel 22 at the lower side by dielectrophoresis in the separation unit 60 (Step S5). In this manner, only the necessary particles can be stored in the output unit 31.

Meanwhile, in the observation circuit 41, the image sensor 40 continuously observes a state of the sample liquid flowing through the flow channel 20 and the branch channels 21 and 22 (Step S11), as illustrated in the flow chart of FIG. 5, simultaneously with the above determination and separation operation. Then, it is determined whether the particles have transferred to a predetermined branch channel (Step S12). When it is determined as "YES", the separation operation is repeated (Step S13). When it is determined as "NO", a predetermined operation, such as recording of erroneous determination or stopping the device, is performed (Step S14).

As described above, in the present embodiment, the determination unit 50 can determine the characteristics of the particles in the sample liquid passing through the flow channel 20, based on the measurement signal from the portion of the flow channel 20 of the image sensor 40. Further, the particles are guided to either the branch channel 21 or 22 by dielectrophoresis in the separation unit 60, based on the determination result of the determination unit 50, so that only the necessary particles can be separated. At that time, the electric field depending on the result of the determination unit is applied to the particles and the particles are guided to a predetermined branch channel. It is possible to reduce the damage on the particles because of no injection of droplets in the separation process.

Further, since the image sensor 40 is formed so as to cover the whole of the flow channel 20 and the branch channels 21 and 22, the observation circuit 41 can observe the transfer of the particles from the flow channel 20 to the branch channels 21 and 22. Accordingly, it is possible to contemplate an improvement in accuracy of the separation of the particles and to objectively record the success and failure of the separation.

Conventionally, a part of the inside of the flow channel 20 is locally observed with a microscope or the like, and actual movement of the particles cannot be confirmed. Thus, in order to confirm whether the particles have been separated, it is necessary to perform an examination for analyzing the separated sample liquid again. Further, when such reexamination is performed with a conventional device, damage on the particles is increased, it is not possible to perform the operation itself in some cases. Meanwhile, in the present embodiment, it is possible to accurately confirm the transfer of the particles from the flow channel 20 to the branch channels 21 and 22 based on the measurement signal from the image sensor 40 which covers the flow channel 20 and the branch channels 21 and 22. Thus, it is possible to eliminate the necessity of re-examination.

Second Embodiment

Figures 6, 10:
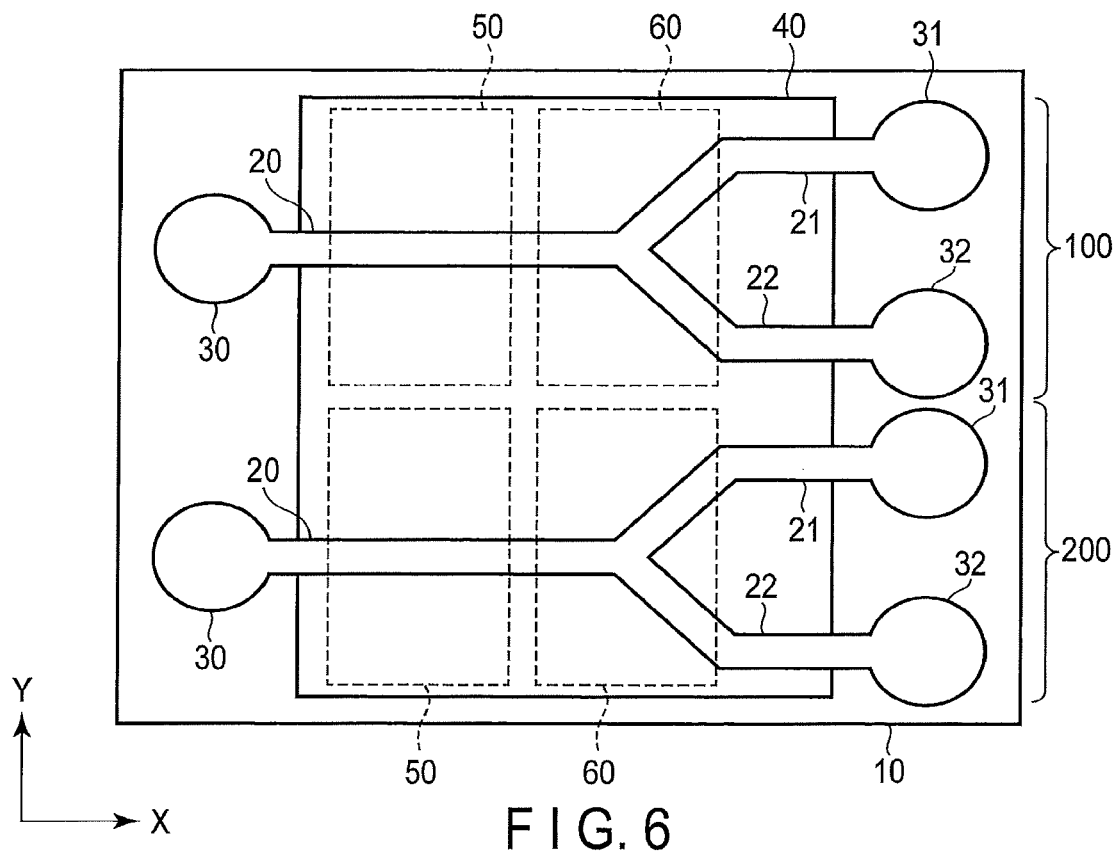
FIG. 6 is a plan view illustrating a schematic configuration of a cell sorter according to a second embodiment.
FIG. 10 is a view for explaining a relationship among three dyes and immunostaining.

FIG. 6 is a plan view illustrating a schematic configuration of a cell sorter according to a second embodiment. Note that the same parts as those shown in FIG. 1 are represented by the same reference numerals and the detailed explanation thereof will be omitted.

A different point between the present embodiment and the first embodiment described above is that a plurality of the cell sorter elements having the same configuration as that of the first embodiment is formed.

On a substrate 10, a first cell sorter element 100 including a flow channel 20, branch channels 21 and 22, an input unit 30, output units 31 and 32, a determination unit 50, and a separation unit 60 is formed. A second cell sorter element 200 having the same configuration as that of the first cell sorter element 100 is formed separately from the first cell sorter element 100 in a direction Y. An image sensor 40 is formed astride a plurality of cell sorter elements 100 and 200 so as to cover the flow channel 20 and the branch channels 21 and 22 of the first cell sorter element 100 as well as the flow channel 20 and the branch channels 21 and 22 of the second cell sorter element 200.

Here, the determination unit 50 may have the cell sorter elements 100 and 200 as common elements. In other words, the determination unit 50 may be configured to determine the characteristics of the particles passing through the flow channel 20 of the cell sorter element 100 based on the output of the pixel at the side of the flow channel 20 of the image sensor 40, and to determine the characteristics of the particles passing through the flow channel 20 of the cell sorter element 200. Further, the particles determined by the determination unit 50 in the first cell sorter element 100 and the determination unit 50 in the second cell sorter element 100 may be the same or different kind.

Note that FIG. 6 illustrates the example in which two cell sorter elements are formed in parallel, and further many more cell sorter elements may be formed in parallel.

In the case of the configuration, it is possible not only to obtain the same effect as that of the first embodiment, but also to concurrently separate the particles. Thus, it is possible to aim at improving the throughput of separation of the particles. This leads to speeding up of the separation of the particles in a sample liquid.

Further, it is possible to produce a plurality of cell sorter elements on the same substrate. Additionally, it is possible to form each unit using the common process and the common member, and thus the production thereof is achieved at substantially the comparable cost as when producing a cell sorter element. In other words, it is possible to contemplate a reduction in the production cost of a device having the cell sorter elements.

Third Embodiment

FIG. 7 is a plan view illustrating a schematic configuration of a cell sorter according to a third embodiment. Note that the same parts as those shown in FIG. 1 are represented by the same reference numerals and the detailed explanation thereof will be omitted.

A different point between the present embodiment and the first embodiment described above is that a second-stage cell sorter element is formed at the subsequent stage of a first-stage cell sorter element having the same configuration as that of the first embodiment.

A flow channel (first flow channel) 20 of the first-stage cell sorter element, first-stage branch channels (second flow channels) 21 and 22, an input unit 30, a first determination unit 50, and a first separation unit 60 are the same as those of the first embodiment. One end side of each of the second-stage rebranch channels (third flow channels) 21a and 21b is connected to the other end side of the first-stage branch channel 21, and the other end side of each of the rebranch channels 21a and 21b is connected to each of output units 31a and 31b. One end side of each of the second-stage rebranch channels (third flow channels) 22a and 22b is connected to the other end side of the first-stage branch channel 22, and the other end side of each of the rebranch channels 22a and 22b is connected to each of output units 32a and 32b.

Further, there is formed a second determination unit 55 which determines the particles in the sample liquid in the branch channel 21 and 22. Furthermore, there is formed a second separation unit 65 which guides the particles in the branch channel 21 to either the rebranch channel 21a or 21b and guides the particles in the branch channel 22 to either the rebranch channel 22a or 22b. An image sensor 40 is formed so as to cover the whole of the flow channel 20, the branch channels 21 and 22, and the rebranch channels 21a, 21b, 22a, and 22b.

The configuration of the second determination unit 55 is the same as that of the first determination unit 50, and the characteristics of the particles is configured to be determined based on the measurement signal from the pixel region of the portion of the branch channel 21 of the image sensor 40. The configuration of the second separation unit 65 is the same as that of the first separation unit 60. That is, a dielectrophoresis electrode is formed adjacently to the connection of the branch channel 21 and the rebranch channels 21a and 21b, and a dielectrophoresis electrode is formed adjacently to the connection of the branch channel 22 and the rebranch channels 22a and 22b.

As described above, in the present embodiment, the second-stage cell sorter element is formed at the subsequent stage of the first-stage cell sorter element, the first determination unit 50 and the separation unit 60, and the second determination unit 55 and the separation unit 65 are arranged in series, whereby the separation can be performed with high accuracy. For example, even when the separation of the first stage by the first determination unit 50 and the first separation unit 60 fails and the NG cells are determined as "OK", the cells can be separated to NG at the second stage by the second determination unit 55 and the second separation unit 65. Hence, it is possible to contemplate further improvement in accuracy of the separation. Here, the term "OK cells" or "NG cells" means two groups obtained by dividing the characteristic amount measured by the determination unit into threshold.

Further, the range or ranges of fluorescent light wavelength measured by the second determination unit 55 is configured to be different from the range or ranges of fluorescent light wavelength measured by the first determination unit 50 so that multi-content determination of fluorescent light can be performed.

Note that, in the present embodiment, cell sorter elements are provided at stages and branched into four parts in two steps, but the cell sorter elements may be provided at multiple stages. For example, the cell sorter element is formed in a three-stage structure, thereby achieving eight-stage fractionation.

Fourth Embodiment

FIG. 8 is a plan view illustrating a schematic configuration of a cell sorter according to a fourth embodiment. Note that the same parts as those shown in FIG. 1 are represented by the same reference numerals and the detailed explanation thereof will be omitted.

A different point between the present embodiment and the first embodiment described above is that there is formed a return flow channel 25 from the other end side of the flow channel 20 to the one end side of the flow channel 20. In other words, similarly to the flow channel 20 and the branch channels 21 and 22, the return flow channel 25 is formed on a substrate 10. The other end side of the flow channel 20 and the branch channels 21 and 22 are connected to the one end side of the return flow channel 25, and the other end side of the return flow channel 25 is connected to the one end side of the flow channel 20.

As described above, the return flow channel 25 is formed so that cyclic determination and separation can be performed.

The particles, in which a larger value or a smaller value (OK/NG) than the threshold of the characteristic amount of the target particles is not confirmed by the first determination (for example, overlapping of a plurality of cells), are returned to the input side through the return flow channel 25 and redetermined. Specifically, the particles determined as "OK" by the first determination are guided to the branch channel 21 and stored in the output unit 31. The particles determined as "NG" are guided to the branch channel 22 and stored in the output unit 32. The particles undetermined as "OK" or "NG" are returned to the return flow channel 25. Then, the particles are separated again after the second determination, whereby it is possible to contemplate improvement in yield.

As described above, the particles uncertainly determined as "OK" are returned and redetermined, whereby it is possible to increase the improvement in yield and the accuracy of the separation.

In the first content, it is possible that the particles determined as "OK" are returned to the input side and determined in another content, and then only the particles in which "AND" is taken are flown into "OK". Specifically, in the first determination, the fluorescent light of the first range of wavelength is measured by the determination unit 50, the particles determined as "OK" in the first content are guided to the return flow channel 25, and the particles determined as "NG" are guided to the branch channel 22. In the second determination, the fluorescent light having a different wavelength characteristic from the first wavelength characteristic is measured by the determination unit 50, the particles determined as "OK" in the second content are guided to the branch channel 21, and the particles determined as "NG" are guided to the branch channel 22. Accordingly, it is possible that only the particles determined as "OK" in the first and second contents are guided to the branch channel 21 and only the particles determined as "OK" in the two contents are flown into the output unit 31.

As described above, in the present embodiment, the improvement in yield and the accuracy of the separation can be increased by cyclic determination which repeats the same characteristic determination. Then, the separation based on multi-content determination can be performed by successive approximating determination which sequentially determines different characteristics.

Fifth Embodiment

Figure 9:
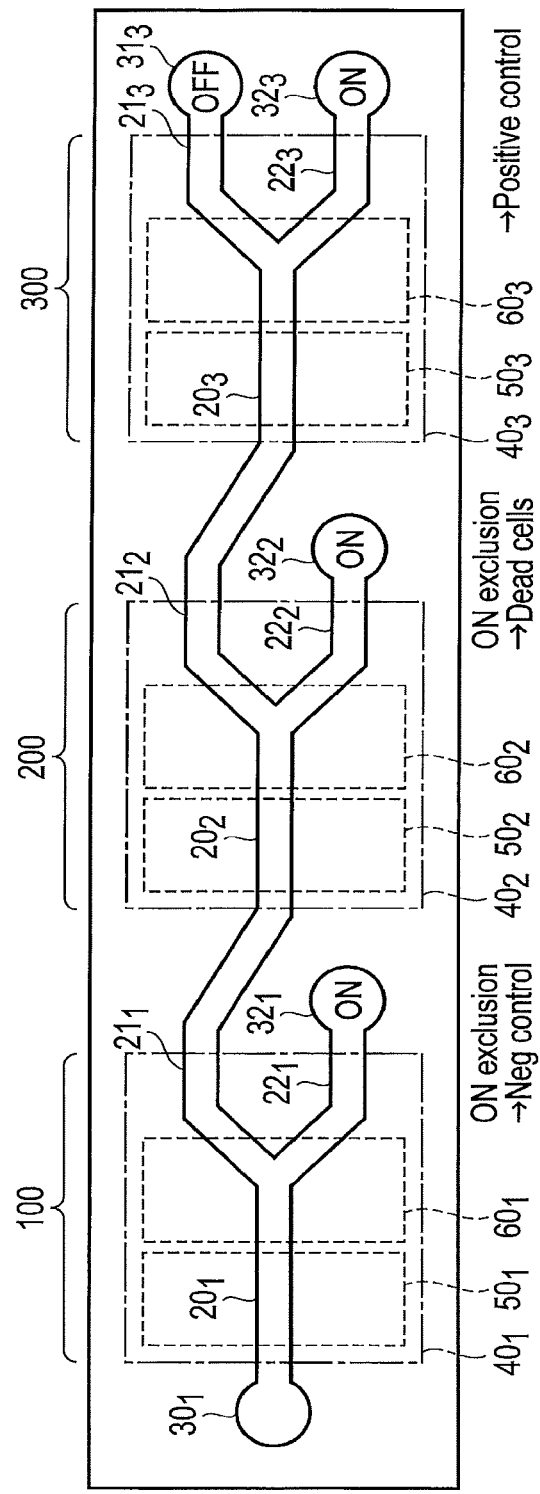
FIG. 9 is a plan view illustrating a schematic configuration of a cell sorter according to a fifth embodiment.

FIG. 9 is a plan view illustrating a schematic configuration of a cell sorter according to a fifth embodiment. Note that the same parts as those shown in FIG. 1 are represented by the same reference numerals and the detailed explanation thereof will be omitted.

A different point between the present embodiment and the first embodiment described above is that cell sorter elements 100, 200, and 300 having the same configuration as that of the first embodiment are formed in series, and the determination content to be excluded when the fluorescent characteristic amount determined by the determination unit is the threshold or more is formed at the upstream section. Here, the term "to be excluded" means that the particles are separated into the flow channel not to be connected with the subsequent stage of the cell sorter element.

The first cell sorter element 100 of the first stage has an input unit $30_1$, a flow channel $20_1$, branch channels $21_1$ and $22_1$, an output unit $32_1$, an image sensor $40_1$, a determination unit $50_1$, and a separation unit $60_1$. The second cell sorter element 200 of the second stage has a flow channel $20_2$, branch channels $21_2$ and $22_2$, an output unit $32_2$, an image sensor $40_2$, a determination unit $50_2$, and a separation unit $60_2$. One end of the flow channel $20_2$ of the second cell sorter element 200 is connected to the other end of the branch channel $21_1$ of the first cell sorter element 100. The third cell sorter element 300 of the third stage has a flow channel $20_3$, branch channels $21_3$ and $22_3$, output units $31_3$ and $32_3$, an image sensor $40_3$, a determination unit $50_3$, and a separation unit $60_3$. One end of the flow channel $20_3$ of the third cell sorter element 300 is connected to the other end of the branch channel $21_2$ of the second cell sorter element 200.

In the first to third cell sorter elements 100 to 300, it is configured that each of the determination units 50 ($50_1$, $50_2$, $50_3$) has an optical filter (not shown) having different optical property on each of the image sensors 40 ($40_1$, $40_2$, $40_3$) and determines mutually different fluorescent characteristics of particles.

Here, the cells in the sample liquid are immunostained with three dyes (for example, 7-AAD, PE, BV510). As illustrated in FIG. 10, a first dye (BV510) is used for negative immunostaining, a second dye (7-AAD) is used for fluorescently staining dead cells, and a third dye (PE) is used for positive immunostaining. In the present embodiment, the cells to be separated are not only the dead cells but also cells in which the fluorescent characteristic amount of negative immunostaining is less than a first threshold and the fluorescent characteristic amount of positive immunostaining is a second threshold or more are separated. The first threshold and the second threshold may be the same values, and may be different values.

Note that fluorescent dyes 7-AAD, PE and BV510 are described by way of example only and various fluorescent dyes can also be applied. Further, the combination of positive staining and negative staining can also be arbitrarily determined by experimenters.

The determination unit $50_1$ of the first cell sorter element 100 measures the fluorescent light corresponding to the first dye (BV510). The determination unit $50_2$ of the second cell sorter element 200 measures the fluorescent light corresponding to the second dye (7-AAD). The determination unit $50_3$ of the third cell sorter element 300 measures the fluorescent light corresponding to the third dye (PE).

When immunostaining is performed using a plurality of dyes, emission of fluorescent light having different wavelengths characteristics occurs simultaneously, and this causes color mixing of the fluorescent light. The level of color mixing of fluorescent light A corresponding to the first dye is small, the level of color mixing of fluorescent light B corresponding to the second dye is middle, and the level of color mixing of fluorescent light C corresponding to the third dye is the largest. In the present embodiment, the cells whose level of color mixing of fluorescent light is small are sequentially excluded.

In the configuration like the present embodiment, when a liquid (for example, an electrolyte solution) is filled in each of the flow channel 20 and the branch channels 21 and 22 and the sample liquid containing particles (such as cells) is supplied to the input unit $30_1$, the sample liquid flows from the upstream side to the downstream side, i.e., from the first cell sorter element 100 to the third cell sorter element 300.

At this time, in the first cell sorter element 100, among the cells in the sample liquid, the cells emitting the fluorescent light corresponding to the first dye for negative immunostaining are excluded using an optical filter $52_1$. In other words, when the determination unit $50_1$ determines that the characteristic amount of the fluorescent light (BV510) is the threshold or more, the separation unit $60_1$ guides the cells in the sample liquid to the branch channel $22_1$ and the output unit $32_1$ stores the cells. The remaining component is guided to the branch channel $21_1$ and then guided to the second cell sorter element 200.

In the second cell sorter element 200, the cells in the sample liquid which emits the fluorescent light corresponding to the second dye are excluded using an optical filter $52_2$. In other words, when the determination unit $50_2$ determines that the characteristic amount of the fluorescent light (7-AAD) is the threshold or more, the separation unit $60_2$ guides the cells to the branch channel $22_2$ and the output unit $32_2$ stores the cells. The remaining component is guided to the branch channel $21_2$ and then guided to the third cell sorter element 300. At that time, cells emitting the fluorescent light (BV510) by the first dye included in the first cell sorter element 100 are not contained in the sample liquid, whereby the determination can be performed without color mixing.

In the third cell sorter element 300, the cells in the sample liquid which emit the fluorescent light corresponding to the third dye are taken out using an optical filter $52_3$. In other words, when the determination unit $50_3$ determines that the characteristic amount of the fluorescent light (PE) is the threshold or more, the cells are guided to the branch channel $22_3$ by the separation unit $60_3$ and stored in the output unit $32_3$. At that time, since both of cells emitting the fluorescent light by the first dye (BV510) included in the first cell sorter element 100 and cells emitting the fluorescent light by the second dye (7-AAD) included in the second cell sorter element 100 are not contained in the sample liquid, the determination can be performed without color mixing. The remaining component is guided to the branch channel $21_3$ and stored in the output unit $31_3$. As a result, only the target cells can be stored in an output unit $32_3$.

In other words, in the first cell sorter element 100, when the fluorescent characteristic amount is the threshold or less, the particles are guided to the branch channel $21_1$, whereas when the fluorescent characteristic amount is the threshold or more, the particles are guided to the branch channel $22_1$. Similarly, in the second cell sorter element 200, when the fluorescent characteristic amount is the threshold or less, the particles are guided to the branch channel $21_2$, whereas when the fluorescent characteristic amount is the threshold or more, the particles are guided to the branch channel $22_2$. In the third cell sorter element 300, when the fluorescent characteristic amount is the threshold or less, the particles are guided to the branch channel $21_3$, whereas when the fluorescent characteristic amount is the threshold or more, the particles are guided to the branch channel $22_3$.

Here, the cell sorter element is not limited to the third stages and can be connected to many stages. At this time, the flow channel section in which the cell sorter element is multi-stage arranged is divided into an upstream-side cell sorter element group including one or more cell sorter elements at the upstream side and a downstream-side cell sorter element group including one or more cell sorter elements at the downstream of the upstream-side cell sorter element group. In the upstream-side cell sorter element group, when the first fluorescent characteristic amount by the determination unit is the threshold or less, the particles are guided to one of the branch channels. In the downstream-side cell sorter element group, when the second fluorescent characteristic amount by the determination unit is the threshold or more, the particles are guided to one of the branch channels. For example, when the cell sorter element is made of eight stages, up to the first- to fourth-stage cell sorter elements, the particles when the characteristic amount is the threshold or less are guided to one of the branch channel. Up to the fifth- to eighth-stage cell sorter elements, the particles when the characteristic amount is the threshold or more are guided to one of the branch channel.

In the example of FIG. 9, the first and second cell sorter elements 100 and 200 are defined as the upstream-side cell sorter element group, and the third cell sorter element 300 is defined as the downstream-side cell sorter element group. In the upstream-side cell sorter element group, when the first fluorescent characteristic amount by the determination unit 50 (characteristic amount of (BV510) and (7-AAD)) is the threshold or less, the particles are guided to one of the branch channels (side of 21). In the downstream-side cell sorter element group, when the second fluorescent characteristic amount by the determination unit 50 (characteristic amount of (PE)) is the threshold or more, the particles are guided to one of the branch channels (side of 21).

As described above, in the present embodiment, the cell sorter elements 100, 200, and 300 are connected in series and each of the cell sorter elements 100, 200, and 300 separate different cells, whereby only the target cells can be accurately separated even if plural kinds of cells are mixed in the sample liquid. In this case, when fluorescent light is emitted, the cells to be excluded are sequentially excluded, thereby reducing an influence of color mixture. Therefore, the accuracy of the separation can be improved.

Note that, in the present embodiment, three-stage cell sorter elements are formed in series, cell sorter elements may be formed in parallel at any of the stages.

Modified Example

Note that the invention is not limited to each of the above-described embodiments.

Although, in the embodiments, the number of the branch channel connected to a flow channel is two, three or more branch channels may be connected to a flow channel.

The image sensor is not necessarily a CMOS or CCD sensor, and may be an image sensor capable of continuously imaging the region from the flow channel to each of the branch channels and imaging the presence of the particles at the cell level.

The separation unit is not necessarily a separation unit using dielectrophoresis, and may be a separation unit using electrophoresis, ultrasonic wave, air pressure control, optical tweezer, magnetism or the like. Note that fluorescent dyes 7-AAD, PE and BV510 are described by way of example only and various fluorescent dyes can also be applied.

Further, the invention is not limited to the separation of cells and can be applied to the blood cells, sperms, fungus, bacteria, pollen, PM2.5, PM1, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cell sorter, comprising:
a substrate;
a flow channel which supplies a sample liquid containing particles from one end side;
a plurality of branch channels which are connected to the other end side of the flow channel;
an image sensor which is provided in a surface region of the substrate, which is located beneath bottoms of the flow channel and the branch channels, and which has a pixel region covering the flow channel and the branch channels;
a determination unit which determines the characteristics of the particles in the sample liquid from a measurement signal of the pixel region of the portion of the flow channel of the image sensor; and
a separation unit which is provided adjacently to the connection of the flow channel and the branch channels and guides the particles in the sample liquid to any of the branch channels based on the determination result of the determination unit,
wherein the pixel region further covers the separation unit.

2. The cell sorter of claim 1, further comprising an observation unit which observes transfer of the particles from the flow channel to the branch channels from the measurement signal of the image sensor.

3. The cell sorter of claim 1, wherein
the determination unit has an optical filter which blocks a specific range or specific ranges of wavelength.

4. The cell sorter of claim 1, wherein
the determination unit has a light source which irradiates the flow channel and the branch channels with light.

5. The cell sorter of claim 1, wherein
the separation unit deflects the particles in a specific direction using dielectrophoresis, electrophoresis, ultrasonic wave, air pressure control, optical tweezer, magnetism.

6. The cell sorter of claim 1, wherein
the separation unit has an electrode or electrodes.

7. The cell sorter of claim 1, wherein
a plurality of cell sorter elements having the flow channel, the branch channels, the image sensor, the determination unit, and the separation unit are arranged in parallel, and the image sensor is commonly used for different cell sorter elements.

8. The cell sorter of claim 1, further comprising
a return flow channel which is provided so as to connect one end side of the flow channel to the other end side of the flow channel, wherein the separation unit guides the particles in the sample liquid to any of the branch channels or the return flow channel based on the determination result of the determination unit.

9. The cell sorter of claim 1, further comprising:
a plurality of rebranch channels connected to the branch channels;
a redetermination unit which determines the characteristics of the particles in the sample liquid from the measurement signal of the pixel region of the portion of the branch channels of the image sensor; and
a reseparation unit which is provided adjacently to the connection of the branch channels and the rebranch channels and guides the particles in the sample liquid to any of the rebranch channels based on the determination result of the redetermination unit.

10. A cell sorter, comprising:
a substrate;
a plurality of cell sorter elements arranged in series, the cell sorter elements each comprising:
a flow channel which supplies a sample liquid containing particles from one end side;
a plurality of branch channels whose one end is connected to the other end side of the flow channel;
an image sensor which is provided in a surface region of the substrate, which is located beneath bottoms of the flow channel and the branch channels, and which has a pixel region covering the flow channel and the branch channels;
a determination unit which determines the characteristics of the particles in the sample liquid from a measurement signal of the pixel region of the portion of the flow channel of the image sensor; and
a separation unit which is provided adjacently to the connection of the flow channel and the branch channels and guides the particles in the sample liquid in the flow channel to any of the branch channels based on the determination result of the determination unit;
wherein,
one end of the flow channel of the cell sorter element at the downstream side is connected to the other end of one of the branch channels of the cell sorter element at the upstream side,
the determination unit of each of the cell sorter elements determines different characteristic of particles, and
wherein the pixel region further covers the separation unit.

11. The cell sorter of claim 10, wherein each of the cell sorter elements further comprises an observation unit which observes transfer of the particles from the flow channel to the branch channels from the measurement signal of the image sensor.

12. The cell sorter of claim 10, wherein
the determination unit determines the fluorescent characteristic amount of the particles based on the measurement signal, and
the separation unit guides the particles to one of the branch channels based on the fluorescent characteristic amount.

13. The cell sorter of claim 10, wherein
the determination unit has a light source which irradiates the flow channel and the branch channels with light.

14. A cell sorter, comprising:
a substrate
a flow channel section in which a cell sorter element having a first flow channel for supplying a sample liquid containing particles from one end side and a plurality of branch channels whose one end is connected to the other end side of the first flow channel is multi-stage arranged;
an image sensor which is provided in a surface region of the substrate, which is located beneath a bottom of the flow channel section, and which has a pixel region which covers the whole of the first flow channel and the branch channels or a pixel region which covers the flow channel section, for the cell sorter element;
a determination unit which determines the characteristics of particles in the sample liquid from a measurement signal of the pixel region of the portion of the first flow channel of the image sensor, for the cell sorter element; and
a separation unit which is provided adjacently to the connection of the first flow channel and the branch channels and guides particles in the sample liquid in the first flow channel to any of the branch channels based on the determination result of the determination unit, for the cell sorter element,
wherein the pixel region further covers the separation unit.

15. The cell sorter of claim 14, further comprising an observation unit which observes transfer of the particles in the flow channel section from the measurement signal of the image sensor.

16. The cell sorter of claim 14, wherein
the cell sorter element is provided in parallel at any of the stages.

17. The cell sorter of claim 14, wherein
the flow channel section is multi-stage arranged by connecting one end of the first flow channel of the cell sorter element at the downstream side to the other end of one of the branch channels of the cell sorter element at the upstream side, and
the determination unit of each of the cell sorter elements determines different characteristic of particles.

18. The cell sorter of claim 17, wherein
the determination unit determines the fluorescent characteristic amount of the particles based on the measurement signal,
the flow channel section in which the cell sorter element is multi-stage arranged has an upstream-side cell sorter element group including one or more cell sorter elements at the upstream side and a downstream-side cell sorter element group including one or more cell sorter elements at the downstream of the upstream-side cell sorter element group,
the upstream-side cell sorter element group guides the particles to one of the branch channels based on the first fluorescent characteristic amount by the determination unit, and
the downstream-side cell sorter element group guides the particles to another one of the branch channels based on a second fluorescent characteristic amount by the determination unit.

19. The cell sorter of claim 16, wherein
the determination unit has a light source which irradiates the flow channel and the branch channels with light.

* * * * *